(12) United States Patent
Hundley (10) Patent No.: US 12,145,411 B2
(45) Date of Patent: Nov. 19, 2024

(54) PALLET TRAIN

(71) Applicant: Kenneth Wayne Hundley, Martinsville, VA (US)

(72) Inventor: Kenneth Wayne Hundley, Martinsville, VA (US)

( * ) Notice: Subject to any disclaimer, the term of this patent is extended or adjusted under 35 U.S.C. 154(b) by 0 days.

(21) Appl. No.: 18/420,615

(22) Filed: Jan. 23, 2024

(65) Prior Publication Data

US 2024/0246377 A1 Jul. 25, 2024

Related U.S. Application Data

(60) Provisional application No. 63/440,773, filed on Jan. 24, 2023.

(51) Int. Cl.
| | |
|---|---|
| *B62B 3/00* | (2006.01) |
| *B60D 1/48* | (2006.01) |
| *B62B 3/02* | (2006.01) |
| *B62B 5/00* | (2006.01) |
| *B62D 39/00* | (2006.01) |
| *B60D 1/00* | (2006.01) |
| *B60D 3/00* | (2006.01) |

(52) U.S. Cl.
CPC ............... *B60D 1/481* (2013.01); *B62B 3/02* (2013.01); *B60D 1/00* (2013.01); *B60D 2001/005* (2013.01); *B60D 3/00* (2013.01)

(58) Field of Classification Search
CPC .... B60D 1/481; B60D 2001/005; B60D 1/54; B60D 1/00; B62B 3/02; B62B 3/00; B62B 3/001; B62B 3/022; B62B 3/025; B62B 5/00

See application file for complete search history.

(56) References Cited

U.S. PATENT DOCUMENTS

| | | | | |
|---|---|---|---|---|
| 3,552,761 | A * | 1/1971 | Sjöblom | B62B 3/025 |
| | | | | 280/42 |
| 4,863,179 | A * | 9/1989 | Isaacs | B62B 3/00 |
| | | | | 280/33.996 |
| 7,419,458 | B2 * | 9/2008 | Forcillo | A63B 21/4049 |
| | | | | 482/57 |

FOREIGN PATENT DOCUMENTS

| | | | | |
|---|---|---|---|---|
| CN | 110435729 A | * | 11/2019 | ............... B62B 3/02 |
| DE | 10062425 B4 | * | 4/2006 | ............. B62B 3/022 |
| EP | 1396414 A2 | * | 3/2004 | ............. B62B 3/001 |

* cited by examiner

*Primary Examiner* — Tan Le (57) ABSTRACT

The pallet train is a series of platforms, that are mounted on wheels and casters and can be linked to other platforms to form a train to haul freight inside a freight trailer includes: a platform, multiple perimeter stops on the outside of the platform, net hooks mounted on two sides of the platform that connect to nets, a pair of nets that wrap over the top of the freight to hold freight down, four casters on the bottom surface, a metal carriage assembly that features pop pins that engage with the tow bar, a tow bar slidably mounted inside the carriage assembly to connect the platforms to each other, metal strips on the corners to protect from damage, an optional tray slidably mounted on the platform using four metal posts that is adjustable for height, and a pop pin puller to disengage the pop pins.

7 Claims, 12 Drawing Sheets

PALLET TRAIN

CROSS-REFERENCE TO RELATED APPLICATIONS

This application claims priority benefit of U.S. Provisional Patent Application No. 63/440,773 filed on Jan. 24, 2023 entitled The Pallet Train, the entire contents of which are hereby expressly incorporated by reference.

FIELD OF THE INVENTION

This invention relates generally to the field of transporting freight, and more particularly embodiments of the invention relate to systems and devices for a pallet train.

BACKGROUND OF THE INVENTION

Typically, transporting freight involves packing goods onto a pallet that are secured with pallet wrap and transported by tractor-trailers to retail stores, warehouses, and factories. Existing freight transport processes are cumbersome and inefficient.

The embodiments of this disclosure relate to transporting freight, that is usually packed onto a pallet, secured with pallet wrap and transported by tractor trailers to retail stores and warehouses and factories. The present disclosure relates to moving this freight on platforms that have casters instead of using a normal freight pallet without using pallet wrap. This new system is called the Pallet Train. The train description is used because these platforms can be linked together allowing them to be loaded and unloaded in a trailer as one unit. Wal-Mart currently moves a conveyer belt inside their trailers to unload them. This means that someone must remove the pallet wrap from their pallets inside the trailer, remove the contents of a pallet, and then load it onto the conveyer belt. Someone on the outside of the trailer will unload the freight from the conveyer belt and put it on a cart that will eventually go onto the floor of a store. This process can take several hours for each trailer load. With the Pallet Train system, you can eliminate the work that these two individuals perform and get the product onto the floor without ever having to touch the products until it is ready to go on the shelves.

Most companies that move freight use a forklift or a pallet jack to go inside a trailer, pick the pallet up and then move it to a location inside the warehouse or store. For these companies, a conventional freight pallet must be moved by these two tools. This system mandates that the freight be handled multiple times before it ends up in the destination warehouse or store. In the process of moving that freight with a forklift, other things are impacted, including other pallets that are being accidentally hit with the forklift and other things in the warehouse or store are also affected by how well the forklift driver is at their job. If the driver moves too fast around a corner, the freight on a pallet may come off. This means that the freight on that pallet must be repackaged. Removing the pallet wrap on a pallet is the first thing that must happen. The freight must be repositioned on the pallet and the new pallet wrap must be applied. Sometimes the freight on a pallet does not make it to the destination because this process was not done correctly.

Forklift operators are always behind schedule and they often operate the forklift at speeds that cause additional problems. On a day that a forklift operator does not show up, if someone does not replace that operator, the freight will sit until someone who is qualified to operate the forklift, can move it. The cost associated with forklift usage is often not even calculated in the price to move freight. Before pallets may be removed from a trailer, there must be sufficient room outside the trailer to move the pallets to. If the warehouse space is not sufficient, pallets that are already on the warehouse floor may have to be moved to make room for the new pallets. Forklift operators usually make a wage between $15. an hour up to $25. an hour. A full trailer that is forty-eight feet long can hold twenty-four pallets that are approximately four feet square. When the operator removes these pallets from a trailer, it usually takes about two minutes for each pallet to be removed from the trailer, depending on where that freight must me moved to. If your freight destination is a retail store, your freight must be handled multiple times before it goes onto the store shelves. First, someone has to remove the pallet wrap and dispose of it. Then they must get a different cart to load the freight onto and load that cart up so the product can be taken onto the retail floor for restocking.

To find the total cost of this process, you must also factor in the cost of propane for the forklift, the time that it takes to change the propane tank out, and the maintenance time used to keep the forklift operational. If a pallet is removed from a trailer and it has to be repackaged, this adds to the cost of moving the freight. Put these costs together and it can easily add up to $40. per truckload to remove the freight and get it onto a cart so it can go on the store shelves. The Pallet Train will eliminate the need for forklifts and pallet jacks to go inside the trailer and unload it. This technology will save a lot of time and money for anyone who has a lot of their own trailers.

SUMMARY

The Pallet Train system uses a series of specially designed platforms with casters on the bottom that provide multiple options to move the freight in a trailer or in a warehouse much faster than using conventional pallets. This system is going to eliminate the need to use forklifts, pallet jacks, pallets, and pallet wrap to ship and move freight. Under the right circumstances, the Pallet Train system will allow you to load and unload a 53 foot trailer in less than 2 minutes without anyone going inside the trailer and without any machinery going inside the trailer. This eliminates the need for a forklift and operator to unload the freight. When you stop using a forklift to move pallets, you also eliminate the damage from the forks on the forklift cause to other freight and warehouse structures, while retrieving and moving pallets.

There are two different models of the platform, and they are the standard model and the custom model. The standard model has very limited features and the custom model that has all the features. The standard platforms are about 44"× 46"×7". These dimensions can be made to custom specs if desired. The standard model has multiple features on the top surface. There are perimeter stops located on the edges of the platform that are attached with wood screws. The perimeter stops are linear and about ½" square and they are movable to the client's needs. These stops are being used to help keep freight and boxes on the platform from sliding off. Close to the perimeter stops are the net hooks. Net hooks are used to hold the freight down to the platform instead of using pallet wrap. There are two nets for this. There is a front and there is a rear part of the platforms. On both ends of the platform in the center are rectangular shaped steel plates that surround the top of a pop pin. The top of the pop pin is a loop. This loop is used in conjunction with a pop pin puller to disengage the pop pin to enable the adjustment of the tow bar, which is on the bottom side of the platform. The rounded corners of the platform are covered with metal corner bumper guards. These protect the platforms from bumping into things and to each other. Even with this basic setup, the platform can cut the time that is used by people moving and handling freight.

The bottom of the platform has 4 casters. The front casters pivot so the platform can turn corners in a warehouse and the back casters are rigid with brakes. Also on the bottom and the in the center of the platform, there is a carriage assembly that runs from one end of the platform to the other. The front part of the assembly is the tow bar housing, and this is where the tow bar is stored. This is a metal assembly and on the other end of this assembly is the carriage link plates. This is where the host platform connects to the platform in front of it. In this description, the host platform is referred to as the main platform that has different hardware in the front of it than the hardware in the rear of it used to connect to other platforms. The carriage assembly has multiple functions. The first function to create additional strength for the platform itself with the carriage link bar, which can be fortified to gain even more strength. The second function is to provide an apparatus to link the platforms together. Attached to both ends of the carriage assembly are pop pins, and these protrude from the bottom of the platform to the top surface of the platform. The pop pins hold the tow bar in different positions. When the platforms are in a trailer and are being transported to a warehouse or store, the tow bar in the host platform is positioned for the transport mode. This leaves the distance from one platform to another about one to two inches. When the trailer is transporting the platforms, this tow bar position will help to keep them from turning over if the trailer goes around a sharp turn accidentally. If the platforms are being unloaded from a trailer and must quickly turn corners in the warehouse, the pop pin is disengaged in the host platform and the tow bar is moved to the unload position and the pop pin is engaged again. Now the platforms are about eight inches apart. This gives the platforms room to turn but still keep them connected to each other. Platforms can come out all at once or you can disconnect a certain amount of platforms and bring them out when you want. If you are moving the conventional pallets and the forklift operator does not show up for work, your freight will sit until someone can move it. If the forklift is not working properly and can't b use, the freight will sit. With the Pallet Train, if it is necessary, you can disconnect the platforms, one at a time and and move it by hand. No more down time because the forklift or the operator are not available. No more moving freight on pallets with forklifts and pallet jacks.

The custom platform has these features and more. This platform comes with an additional tray that is mounted on four square tray vertical posts in the corners of the platform. In order to accommodate these posts, platform corner tubes are mounted into the platform from the top to the bottom of the platform and are attached on the top of the platform to the platform cornet plates. The tray vertical posts are inserted into the platform corner tubes and attached with a safety pin. Once the tray vertical posts are attached to the platform, then you can slide the tray frame down onto these posts to a choice of multiple of holes to create the height you desire. Then you can attach each corner of the tray frame to the tray vertical post with safety pins. This tray frame has a platform that rest inside and is attached to the tray frame. The tray frame has a raised edge on all four sides to help keep boxes from coming off of it. Next, you attach the top of the vertical post angle braces to the two rear posts and attach the lower end of the angle braces to the main platform. If necessary, you can remove the posts, the tray and the angle braces and still have a standard platform. These platforms and trays can be made to customers specifications if desired.

Another option that is offered is a bar code plate that is inserted into holes on the sides of the platform. The bar code plate is used to display bar codes of the boxes or other freight on the platform. If you hold attach a bar code scanner close to the platforms and aligned with the bar code plate, all the freight is scanned as it leaves the trailer. The platforms are also numbered to keep track of freight. When this custom platform rolls out of the trailer, it is ready to go onto the store floor if necessary. If you pack the platforms at the origin warehouse with specific items for a specific aisle, you can take the platforms directly from the trailer to the floor of the store without transferring the products from a pallet to a cart. This will also save a lot of time and money. The Pallet Train will shorten the time from origin warehouse to store shelves dramatically. You will also eliminate the need to buy, move, and store pallets. With the use of the nets, you can eliminate the need for pallet wrap. When one trailer full of packed platforms rolls out of the trailer, you can instantly put empty platforms back on the same trailer. The complete process can take less than 5 minutes.

With a trailer full of these platforms, a company like Wal-Mart can save several hours of time-consuming labor used to get their product on the store shelves, for every truckload of freight they move. When you can cut the time for removal of your freight from the trailer to get it on carts that will go onto the store, from two hours to two minutes, that will have a significant impact for all Wal-Mart's trailers which has been estimated at over 90,000 trailers.

Therefore, it is the object of the invention to provide a system of freight moving that allows you to pack and store freight on a platform that eliminates the need to use a pallet and allows you to remove your freight in a trailer without a forklift, a forklift operator or a pallet jack being used inside the trailer to pick up pallets, which also reduces damage that is caused by the forks on the forklift to freight, when it is being used to move pallets.

It is a further object of the invention to provide a freight moving system that allows you to pack the freight on a platform using perimeter stops that can be moved to any positions on the edge of the platform, to prevent freight and boxes from sliding off the platform and by also utilizing nets and net hooks to eliminate the use of pallet wrap.

It is a further object of the invention to provide a freight moving system that has a carriage assembly attached to the bottom of a platform that provides additional strength to a platform to carry additional freight, it also has pop pins attached to both ends of the carriage assembly that houses the tow bar that connects the platforms together on both ends of the platform.

It is a further object of the invention to provide a freight moving system that allows you to connect a full row of platforms in a trailer, to each other with the use of a tow bar with multiple hinges and multiple holes that can be adjusted to allow mores space between the platforms to leave the trailer and can turn 90 degree corners in a short amount of space.

It is a further object of the invention to attach and detach a tray platform assembly on top of the base platform, that is adjustable in height, can be folded out of the way and it removable is necessary.

It is a further object of the invention to provide a freight moving system that uses a pop pin puller tool that disengages the pop pins that are attached to the carriage assembly that allows you to connect and disconnect the platforms to each other with the use of the tow bar.

DETAILED DESCRIPTION OF DRAWINGS

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
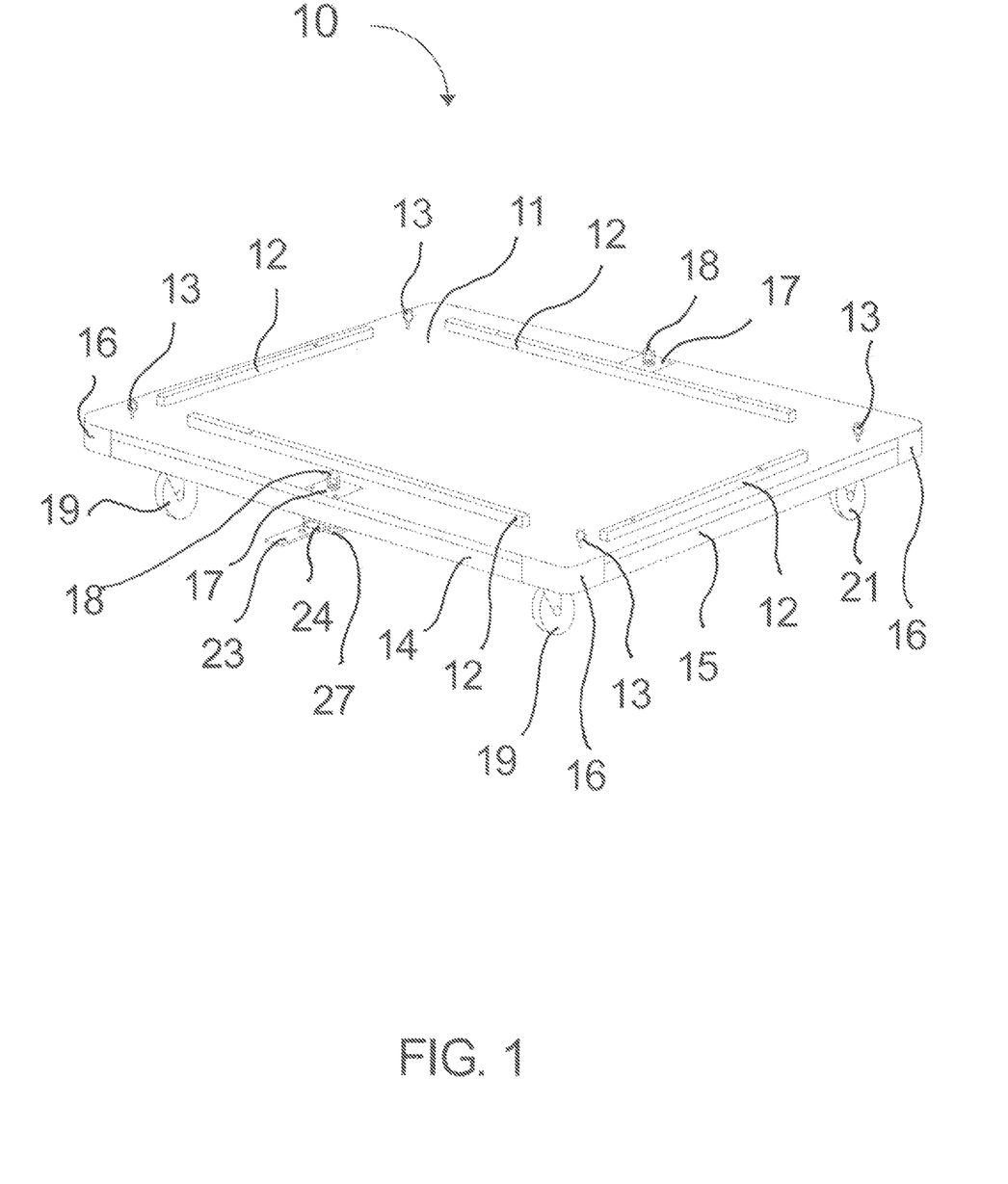
FIG. 1 is a perspective view of the standard platform assembly, according to one embodiment of the present disclosure.

The present invention relates to moving freight on specially designed platforms instead of using pallets. FIG. 1, shows the standard platform, as referenced in numeral 10, which has a platform surface 11, perimeter stops 12, net hooks 13, front platform support 14 attached to the bottom of the platform 10 and attached to the center platform supports 15 on the sides, corner bumper guards 16 attached to the outside corners of the front and rear platform supports (see FIG. 2) and the center platforms supports 15, pop pin plates 17 attached to the platform 10 on the front and rear of the platform, pop pin handles 18 attached to the top of the pop pins, pivoting casters 19 on the bottom side of the platform in the front and rigid casters 21 (i.e., non-pivoting) in the rear. Operatively coupled to the platform 10 proximate the front platform supports 14, a tow bar front plate 23, a tow bar middle plate 24, and a two bar housing bottom plate 27 are depicted.

Figure 2:
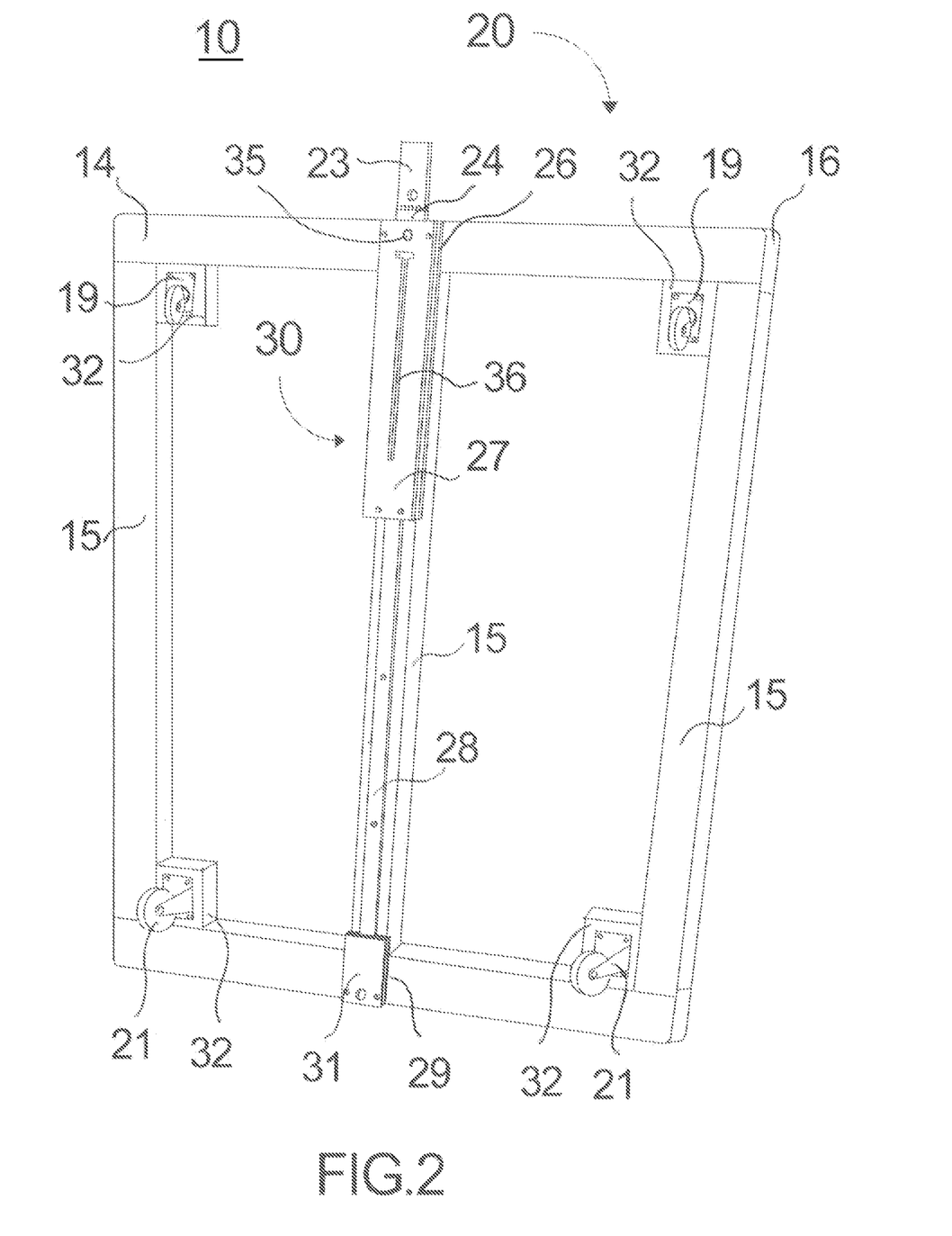
FIG. 2 is a perspective view of the bottom side of a platform assembly revealing two sets of casters and the carriage assembly, according to one embodiment of the present disclosure.

As shown in FIG. 2, the bottom side 20 of the platform 10 has the front and rear platform supports 14 along with the center platform supports 15 attached to the bottom side 20 of the platform 10, front casters 19 attached to caster mounting blocks 32 which are attached to the bottom side 20 of the platform 10, the rear casters 21 attached to the caster mounting blocks 32 which are attached to the bottom side 20 of the platform 10 and also attached to the front and rear platform supports 14 and the center platform supports 15. The tow bar housing top plate 26 and the tow bar housing bottom plate 27 are part of the carriage assembly referenced as 30, which is centrally located on the bottom side 20 of the platform 10 and extends from the front of the platform 10 to the rear of the platform 10. The carriage link bar 28, supplies additional strength to the platform 10 and is connected to the tow bar top plate 26 and the tow bar bottom plate 27 in the front of the platform 10 and is also connected to the carriage link top plate 29 and the carriage link bottom plate 31 on located on the rear of the platform 10. The complete carriage assembly 30 is attached to a platform support 15, located in the center of the platform 10.

Figure 3A:
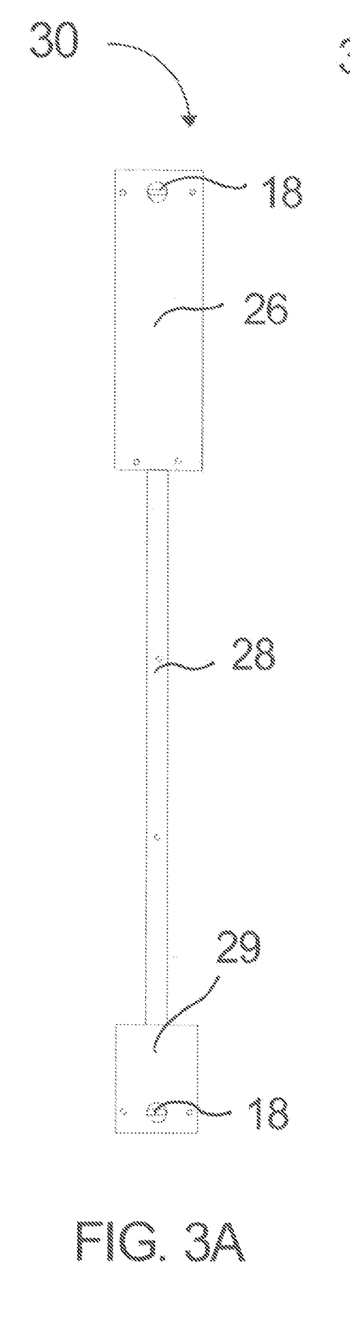
FIG. 3A is top view of a top side of a carriage assembly, according to one embodiment.
Figure 3B:
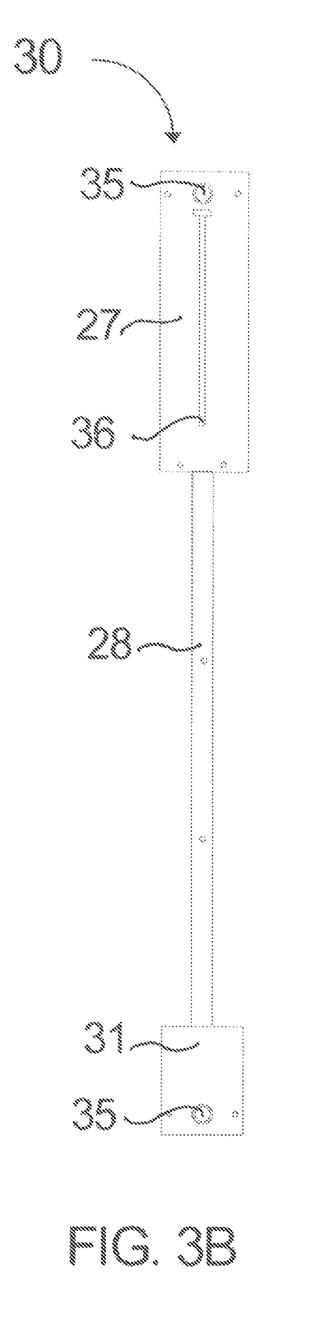
FIG. 3B is a bottom view of a bottom side of the carriage assembly of FIG. 3A.
Figure 3C:
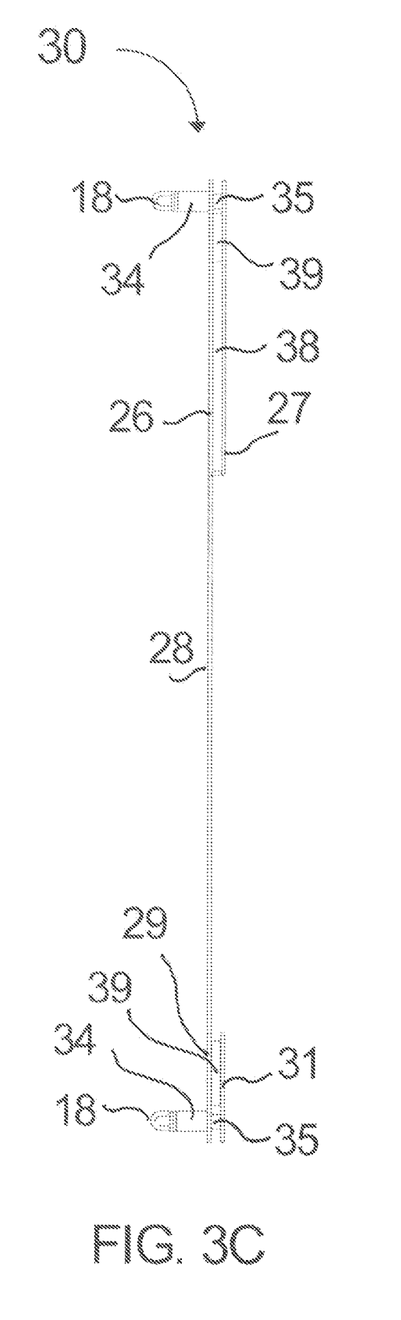
FIG. 3C is a side view of the side of the carriage assembly of FIGS. 3A and 3B, which reveals pop pins.

FIGS. 3A-3C show three views of the carriage assembly referenced as 30. FIG. 3A is top view of a top side of the carriage assembly 30 revealing the tow bar housing top plate 26 which is attached to carriage link bar 28 which is attached to the carriage link top plate 29 and the pop pin handle 18. This is the top side of the carriage assembly 30. FIG. 3B is the bottom side of the carriage assembly 30 and it features the tow bar housing bottom plate 27, the set screw slot 36 centrally cut into the tow bar housing bottom plate 27, the carriage link bar 28, the carriage link bottom plate 31 and the bottom end of the pop pin plunger 35 that engages the tow bar (see FIGS. 5A-6D) to the carriage assembly 30. The screw slot 36 engage a set screw (see FIGS. 5A-5C) and together these are designed as a failsafe to prevent the tow bar (see FIGS. 5A-6D) from coming out of the tow bar housing if the pop pin plunger 35, does not engage in the different holes in the tow bar. FIG. 3C shows a side view of the carriage assembly 30 with the top of the assembly on the left side of the drawing, revealing the pop pin handle 18 mounted inside the pop pin housing 34 which is attached to the tow bar housing top plate 26, the pop pin plunger 35 is spring loaded and housed inside the pop pin housing 34 and engages with the tow bar housing top plate 26 and the tow bar housing bottom plate 27. The long guide 38 connects the tow bar housing top plate 26 and the tow bar housing bottom plate 27 and it functions as a guide when the tow bar (see FIGS. 5A-6D) is being inserted into the front of the carriage assembly. On the bottom end of the carriage assembly 30 is the pop pin handle 18, mounted inside the pop pin housing 34 that is attached to the carriage link top plate 29, and the pop pin plunger 35 that engages the tow bar (see FIGS. 5A-6D) on the rear end of the carriage assembly. The short guide 39 attaches the carriage link top plate 29 to the carriage link bottom plate 31.

Figure 4A:
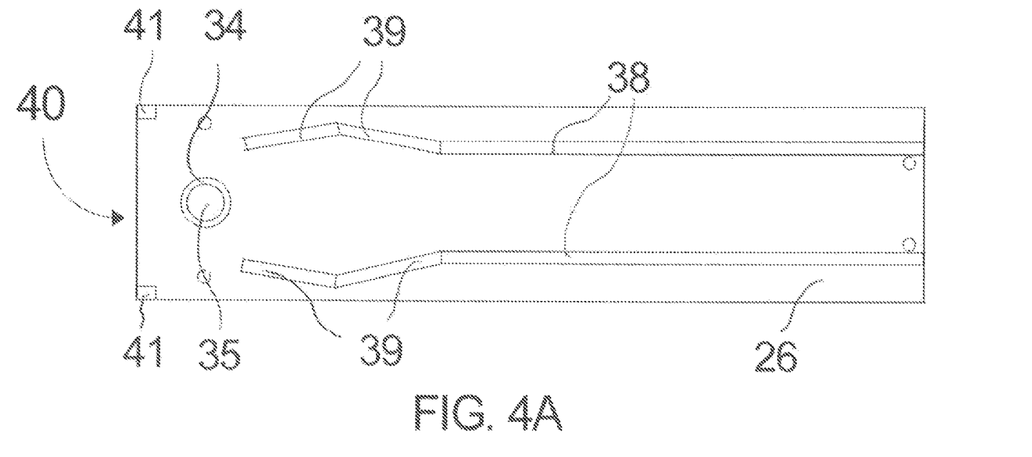
FIG. 4A is a bottom view of the bottom side of a tow bar housing top plate of a tow bar housing, according to one embodiment.
Figure 4B:
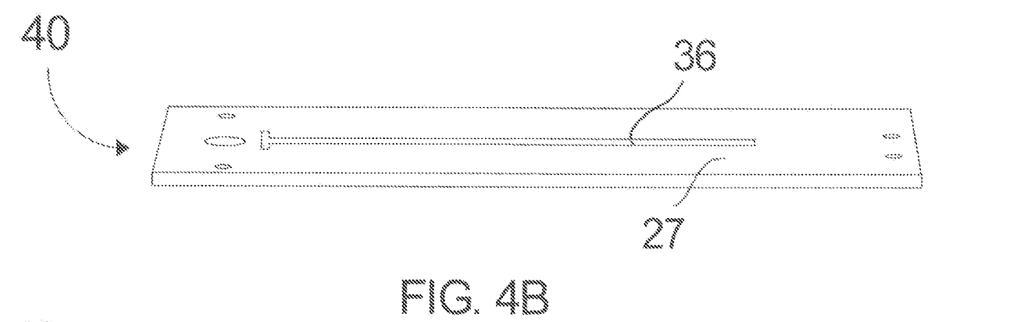
FIG. 4B is a top side perspective view of a tow bar housing bottom plate of a tow bar housing, according to one embodiment.
Figure 4C:
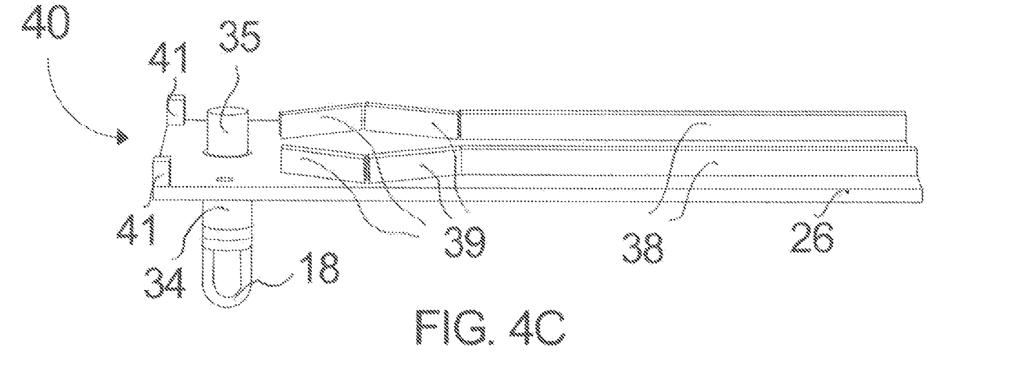
FIG. 4C is a bottom side perspective view of the tow bar housing top plate of FIG. 4A, which reveals guides and a pop pin.

FIGS. 4A-4C depict portions of a tow bar housing 40. FIG. 4A is an aerial view of the bottom side of the tow bar housing top plate 26 that reveals the two long guides 38, the four short guides 39 and the tow bar housing spacers 41 attached to the bottom side of the tow bar housing top plate 26. One edge of the guides 38 and 39, and the spacers 41 is attached to the top bar housing top plate 26 and on the other edge, to the tow bar housing bottom plate 27. The bottom of the pop pin housing 34 is attached flush to the tow bar housing top plate 26 and the pop pin plunger 35 is seen inside the pop pin housing. FIG. 4B is a perspective view of the tow bar housing bottom plate 27 that has the set screw slot 36 cut into the center. FIG. 4C is a perspective view that shows the long guides 38, the short guides 39 and the tow bar housing spacers 41 attached to the bottom side of the tow bar housing top plate 26. Also shown are the pop pin handles 18, the pop pin housing 34 and the spring loaded pop pin plunger 35.

Figure 5A:
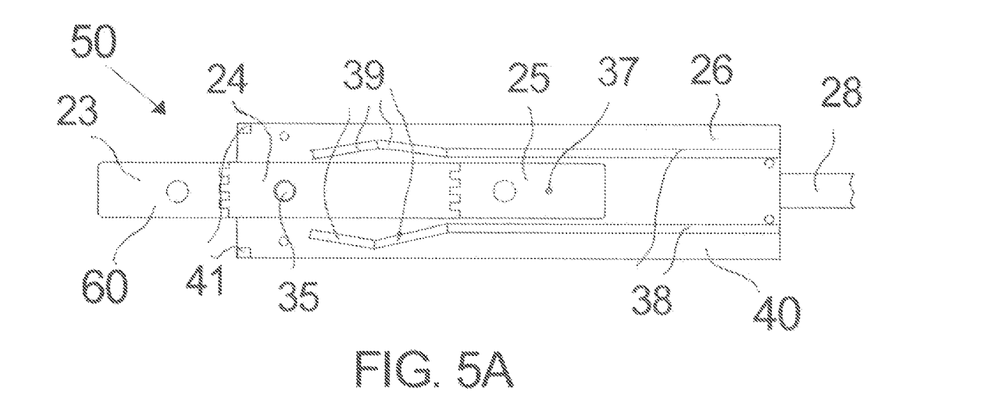
FIG. 5A is a bottom view of a tow bar housing top plate also showing a tow bar, according to one embodiment.
Figure 5B:
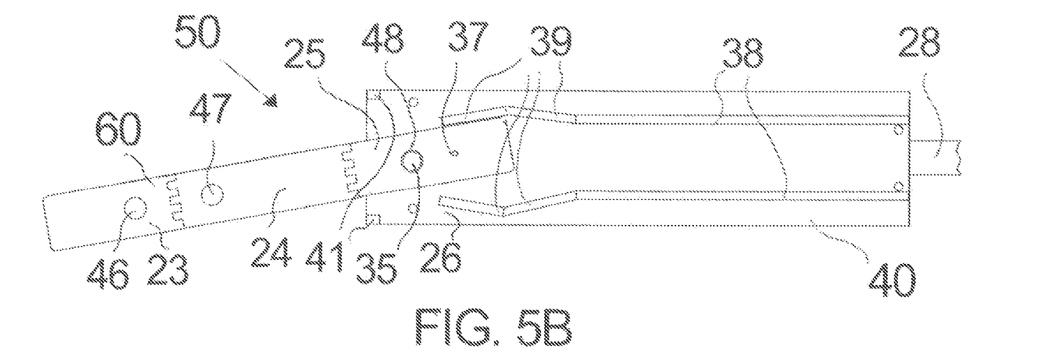
FIG. 5B is a bottom view of the tow bar housing top plate of FIG. 5A with the tow bar in an tilted extended position.
Figure 5C:
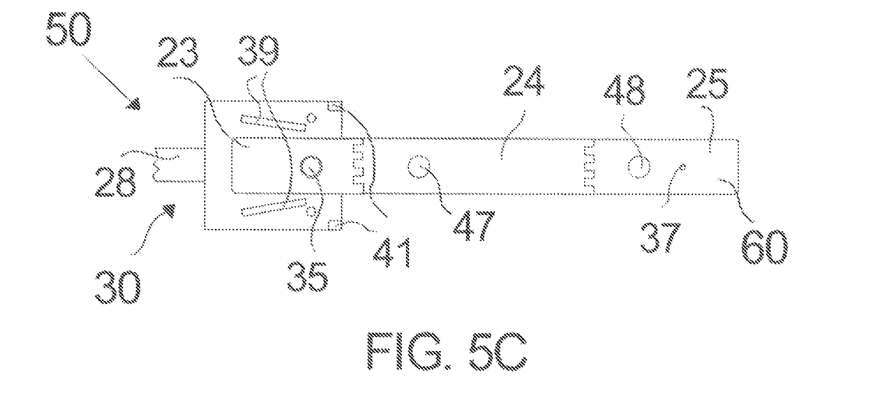
FIG. 5C is a bottom view of the bottom side of carriage link plates attached to a first end of a tow bar, according to one embodiment.

In FIGS. 5A-5C, a tow bar housing 40 and tow bar system 50 are depicted. In FIG. 5A, an aerial view of the tow bar 60 is depicted that includes a tow bar top plate 23, connected to the tow bar middle plate 24 with a hinge, which is connected and the tow bar bottom plate 25 with a hinge, resting in the transport position on top of the tow bar housing top plate 26, surrounded by the long guides 38, which are used to keep the tow bar 60 straight while the platforms are transported inside a trailer, the four short guides 39 located close to the pop pin plunger 35, allow the tow bar 60 to rotate to a predetermined amount of degrees left and right during the unloading process and the tow bar housing spacers 41 attached to the front corners of the tow bar housing top plate 26. The pop pin plunger 35 keeps the tow bar 60 in a fixed position. In this drawing, the pop pin plunger 35 is in the hole on the tow bar middle plate 24 that is used for transporting the platforms that are connected to each other inside a trailer. When the tow bar 60 is in this position, the platforms (see FIGS. 1-2) are about one to two inches apart during transport.

The tow bar top plate 23, connects to the rear end of the platform (see FIGS. 1-2) in front of it. The set screw 37, attached to the tow bar bottom plate 25, and is designed to prevent the tow bar assembly from coming out of the tow bar housing if the pop pin plunger 35, does not engage in the different holes in the tow bar 60. This set screw is used in conjunction with the set screw slot 36, in the tow bar housing bottom plate 27, as seen in FIG. 4B. The carriage link bar 28 is attached to the rear end of the tow bar top plate 26.

FIG. 5B is an aerial view that reveals hole 46 in the tow bar top plate 23 which is used to attach to a rear end of a platform 10 (i.e., between a carriage link top plate 29 and carriage link bottom plate 31) in front of the host platform. Hole 47 in the tow bar middle plate 24 is used in the transport position on the host platform also as seen in FIG. 5A, the pop pin plunger 35 is seen engaged in the hole 48 in the tow bar bottom plate 25, and is used on the host platform for unloading the platforms when they need to turn corners after they exit the trailer. By using this hole in the tow bar bottom plate 25, the space between the platforms increases to abut eight inches which allows the platforms to turn corners once the platforms are out of the trailer. Also in drawing FIG. 5B, you can see that the tow bar is positioned at an angle using the short guides 39 to restrict the movement of the tow bar 60. This allows the platforms to turn corners. The set screw 37 is also featured on the tow bar bottom plate 25.

FIG. 5C shows an aerial view of the rear end of the carriage assembly 30 on the host platform and how the tow bar 60 of the platform behind it connects to the carriage assembly 30 of the host platform. One edge of the guides 38 and 39, and the spacers 41 is attached carriage link top plate 29 and on the other edge is attached to the carriage link bottom plates (see FIG. 3C). The pop pin plunger 35 is engaged with the hole 46 on the tow bar top plate 23 as seen in FIG. 5B. The holes 47 and 48 in the tow bar are used to connect to the platform behind the host platform. The rear end of the carriage link bar 28 is attached to the carriage link top plate 29.

Figure 6A:
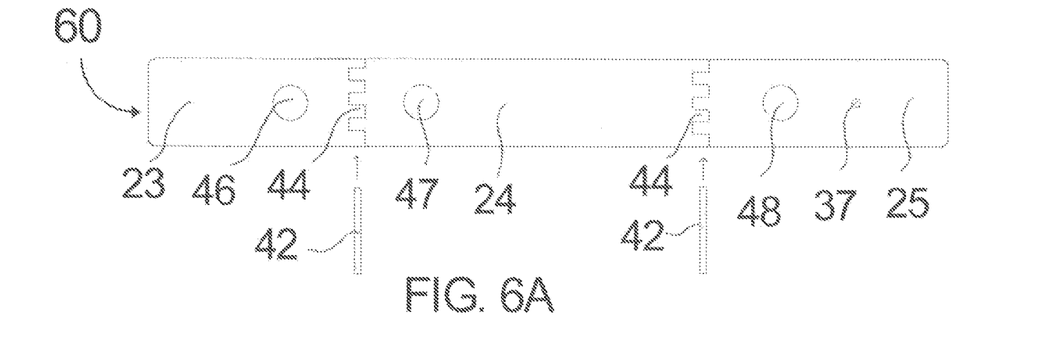
FIG. 6A is a top view of a tow bar that includes two hinges, according to one embodiment.
Figure 6B:
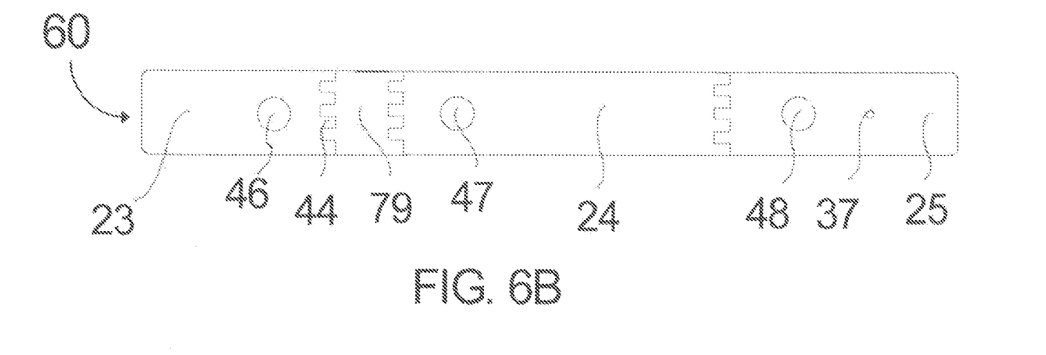
FIG. 6B is a top view of a tow bar that includes three hinges, according to one embodiment.

FIGS. 6A-6D show the tow bar referenced as 60 in four drawings showing all the components of the tow bar. FIG. 6A depicts an aerial view of the tow bar top plate 23 with hole 46, the tow bar middle plate 24 with hole 47, the tow bar bottom plate 25 with hole 48 and the threaded set screw 37 and two hinge pins 42 that protrude the holes in the tow bar knuckles 44 connect these plates to each other. FIG. 6B is also an aerial view of a tow bar assembly, and it has all the same components of the assembly in FIG. 6A but with an extra set of hinges and tow bar knuckles 44. This extra hinge 79 depicted in FIG. 6B is an optional feature and may be needed is circumstances where there is an abundance of uneven surfaces between the end of the trailer and the warehouse floor that the platforms will roll onto.

Figures 6C, 6D:
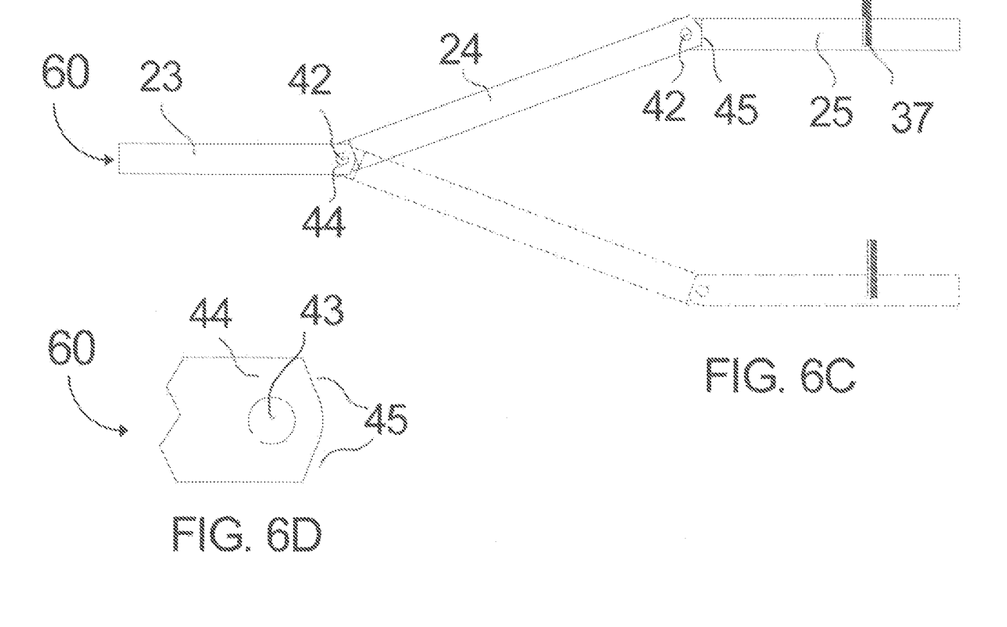
FIG. 6C is a side view of the tow bar of FIG. 6A that includes two hinges in alternate positions.
FIG. 6D is a cutaway side view of a tow bar knuckle, according to one embodiment.

FIG. 6C is a side view of a tow bar 60 with two hinges. The tow bar top plate 23 is connected to the tow bar middle plates 24 at hinge knuckles 44 with hinge pin 42. The tow bar middle plate 24 is connected to the tow bar bottom plate 25 with hinge knuckles 44 and hinge pin 42. The set screw 37 is screwed into the tow bar bottom plate 25. This drawing shows how the hinges allow the plates to bend to a predetermined position upward and downward to accommodate the platforms that are going over uneven surfaces without damaging the platforms.

FIG. 6D is a side view of a hinge knuckle 44 with a hinge pin hole 43 that reveals the edges 45 of a hinge knuckle 44. Normal hinge knuckles have rounded edges to allow total freedom of movement. The hinges on the tow bar 60 are ground down flat on the top and bottom corners to only allow a predetermined amount of movement between the tow bar plates. This allows two platforms that are connected to each with a tow bar, to move over uneven surfaces without putting any pressure on the tow bar, the tow bar housing and the platforms themselves. With this knuckle configuration, the front platform can go over a three-inch drop and the back platform that it is connected to can remain parallel to the ground until its caster wheels move over the uneven edge.

Figure 7:
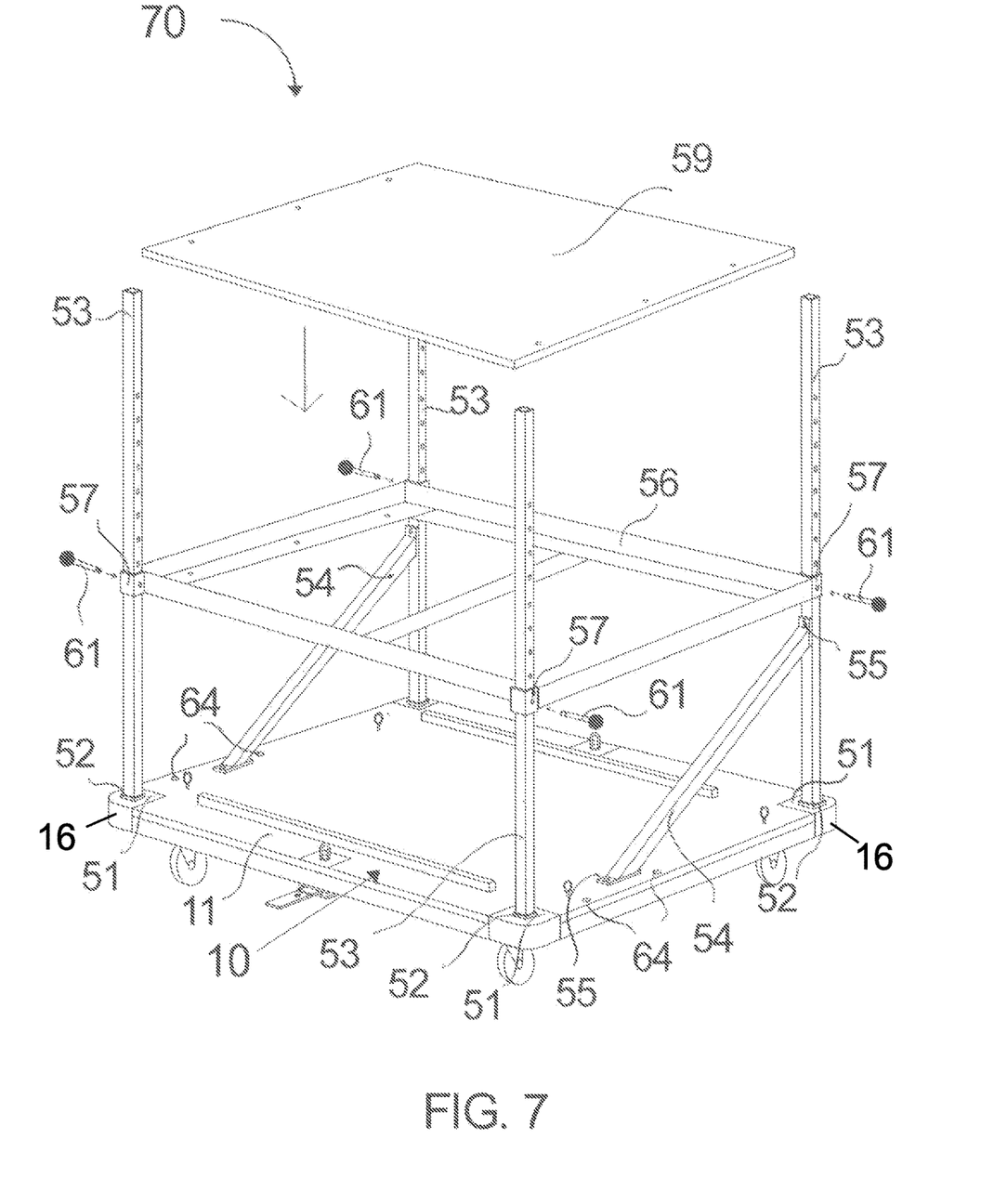
FIG. 7 is a perspective view of a custom platform system showing a four tray vertical post, angle braces, a tray frame, and a tray platform, according to one embodiment.

FIG. 7 represents the custom platform referenced at 70 with all the features of the standard platform 10 from FIG. 1 along with components for a removable and adjustable tray including platform corner tubes 52 that are inserted into the body of the platform 10 on the corners and are attached to platform corner plates 51. The base of the platform 10 also includes bar code plate holes 64, which will be described in further detail in reference to FIGS. 10A-10B. The four tray vertical post 53 are inserted into the platform corner tubes 52 and secured with a safety pin 61 on the bottom side of the platform. (See FIG. 9) The vertical post angle braces 54 have angle brace plates 55 attached to both ends of the angle braces. These plates 55 attach on the top end to the two rear tray vertical post 53 and are also attached to the platform surface 11 on the bottom end. The tray frame 56 is configured to receive a tray platform 59, and features four angle iron shaped supports attached to each on the corners and tray tubes 64 with holes in them are attached to the tray frame 56 on the corners and are slidably mounted onto the tray vertical post 53 and secured by safety pins 61. There are multiple mounting holes (see FIG. 8A) on each tray vertical post 53 used for variable height adjustment. The complete tray assembly can be dismantled in a few minutes.

Figure 8A:
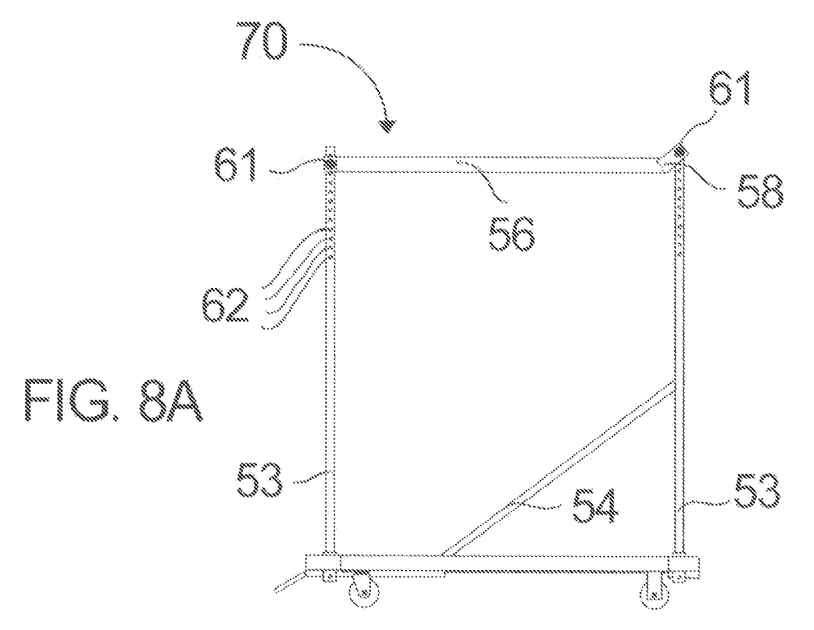
FIG. 8A is a side view of a custom pallet system that includes an optional tray hinge that allows the tray to fold over the rear side of vertical tray posts, according to one embodiment.
Figure 8B:
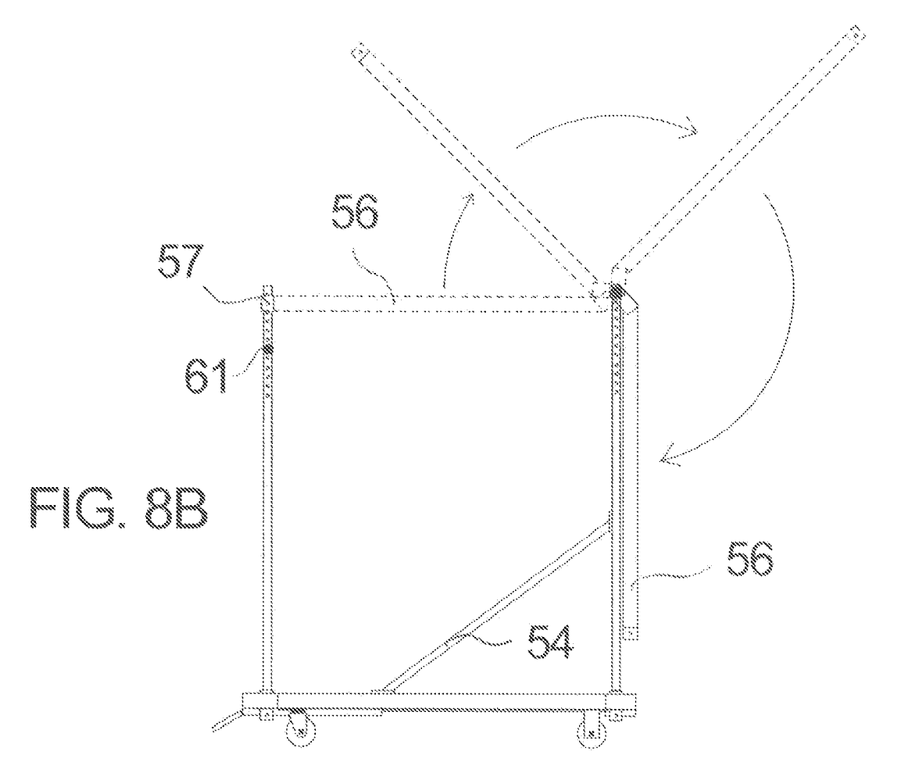
FIG. 8B is a side view of the custom pallet system of FIG. 8A in which the tray is folded over the rear side of the vertical tray posts.

FIGS. 8A-8B show two side views of the custom platform 70. FIG. 8A shows the custom platform 70 with the tray frame 56 in the highest possible position of the adjustment holes 62 on the tray vertical post 53 attached with the safety pin 61 inserted into the tray tubes 57 and the tray vertical post 53. The rear end of the tray frame 56 features two optional tray frame plates 58 attached to the tray frame 56 and secured to the rear tray vertical posts 53, instead of the normal tray tubes with safety pins 61. FIG. 8B reveals when the safety pin 61 in the front tray vertical posts 53 are removed, the tray frame 56 and tray platform (see FIG. 7) can be folded over the back of the rear tray vertical posts 53 after the freight has been removed from the tray frame 56 and the platform (see FIG. 7). This allows easier access to the freight that is loaded on the platform surface 11 of platform 10.

Figure 9:
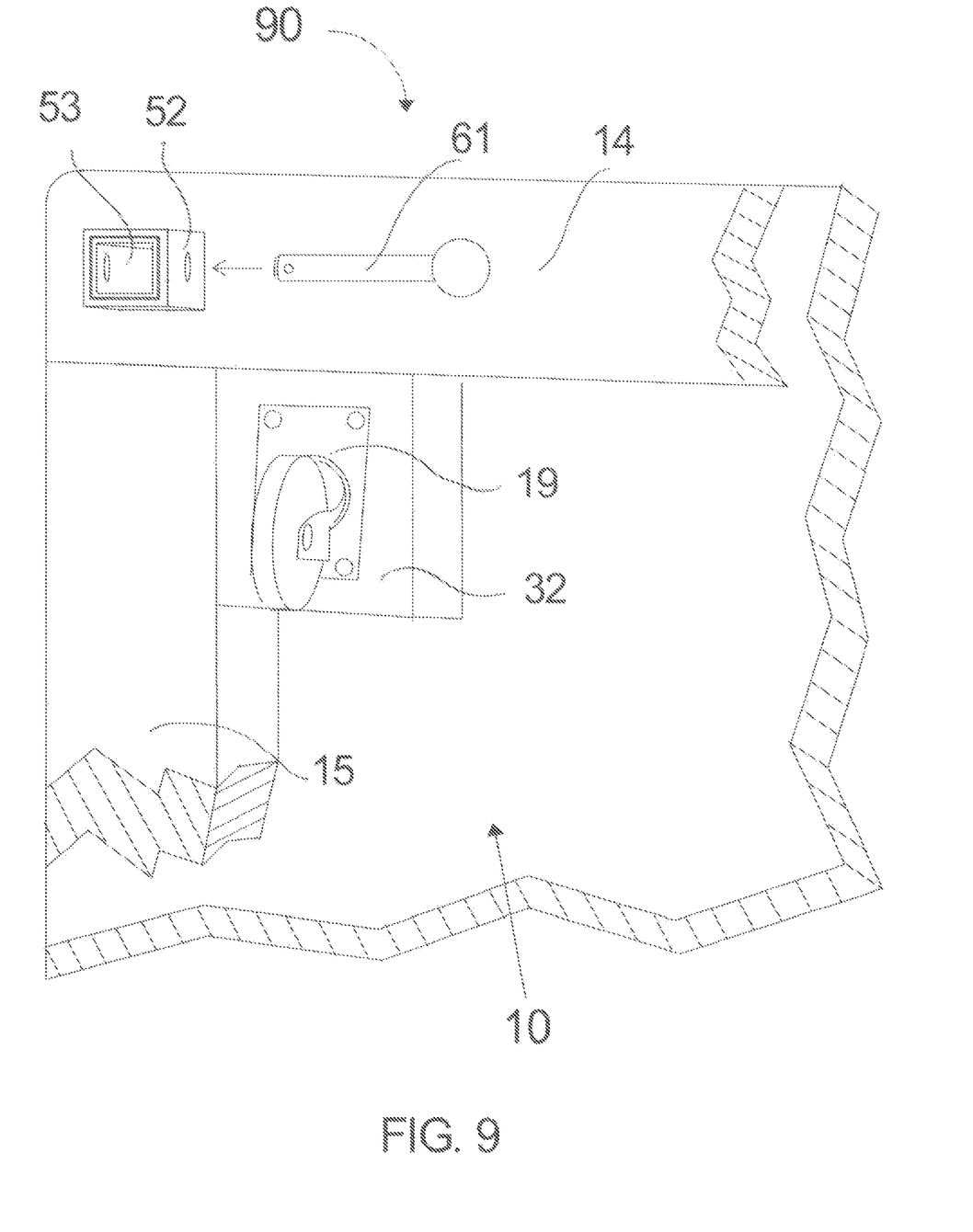
FIG. 9 depicts a perspective view of a portion of the bottom side of a platform assembly that includes a front caster, a caster mounting block, platform corner tubes, a tray vertical post, and tray adjustment pins, according to one embodiment.

FIG. 9 is a closeup cutaway perspective view of a corner on the bottom of the custom platform referenced at 90 that reveals how the tray vertical post 53 attaches to the platform corner tubes 52. This drawing shows the front platform support 14 attached to the center platform support 15 and both supports are attached to the platform 10. The caster mounting block 32 is attached to the front platform support 14, the center platform support 15 and the platform 11. The front caster 19 is attached to the caster mounting block 32. The platform corner tube 52 is protruding through the bottom of the front platform support 14. The tray vertical post 53 is inserted through the platform corner tube 52, extends upward and is kept in place with a safety pin 61, which is inserted through respective holes of the tray vertical post 53 and the platform corner tube 52.

Figure 10:
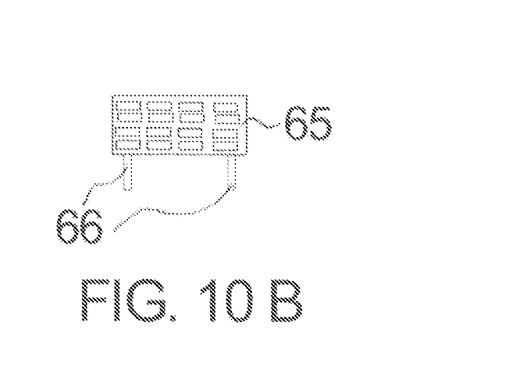
FIG. 10A depicts a side view of a platform system that includes front and rear casters, net hooks, a net, and a barcode plate, according to one embodiment.
FIG. 10B depicts a magnified view of the barcode plate of FIG. 10A removed from the platform system such that the bar code posts are visible.
Figure 10A:
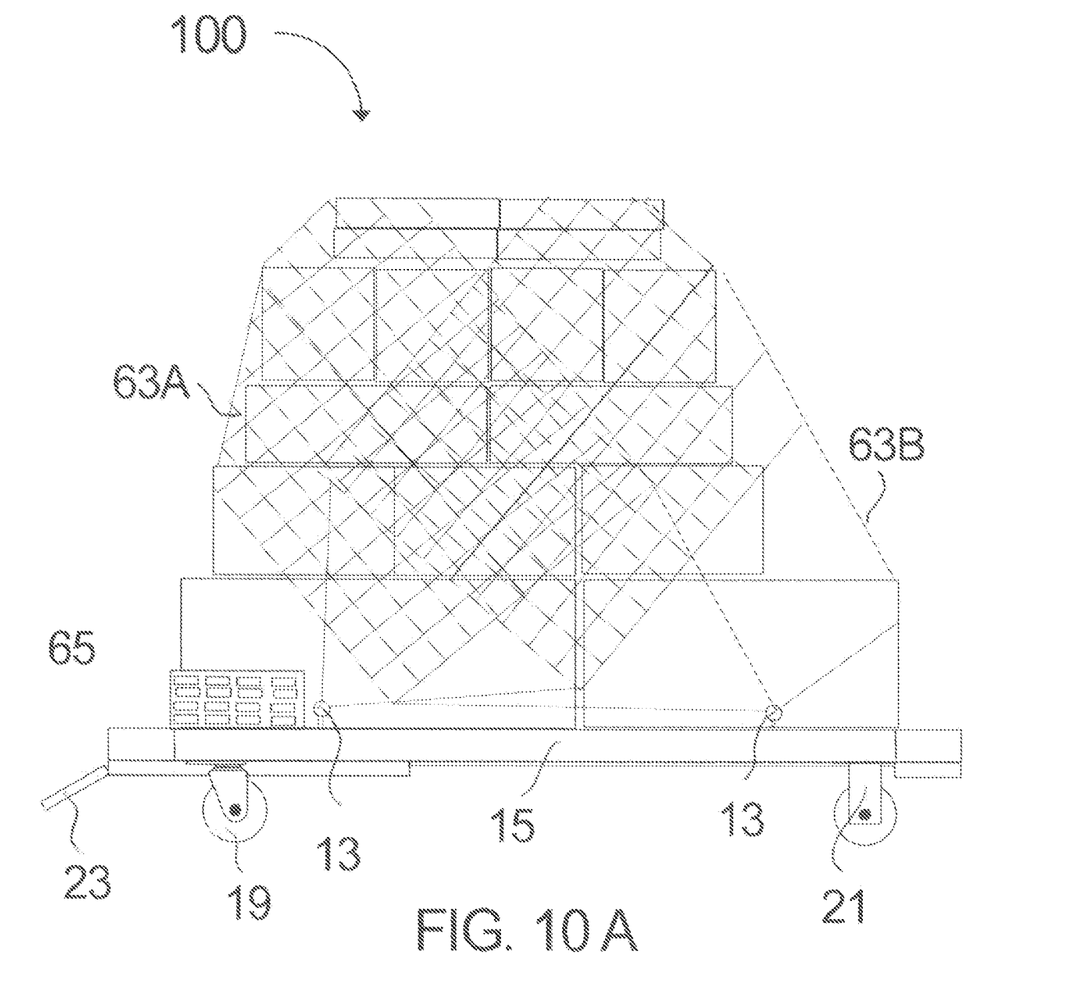

FIG. 10A depicts a loaded custom platform system 100 similar to those of FIGS. 7-8B, with a front caster 19 and a rear caster 21 and the net hooks 13 that are screwed into the center platform support 15 and connected to the nets 63A, 63B. There are two nets for each platform. The optional bar code plate 65 is attached to the bar code posts 66, as depicted by FIG. 10B, and inserted into the bar code plate holes (see FIG. 7) on the top of the platform 10. The bar code plate 65 can be used to hold the duplicate stickers that go onto the freight boxes and packages and can be scanned from one position outside of the trailer when the platforms are being unloaded. This helps to save time and to keep track of the freight without having to scan individual packages and boxes.

Figure 11:
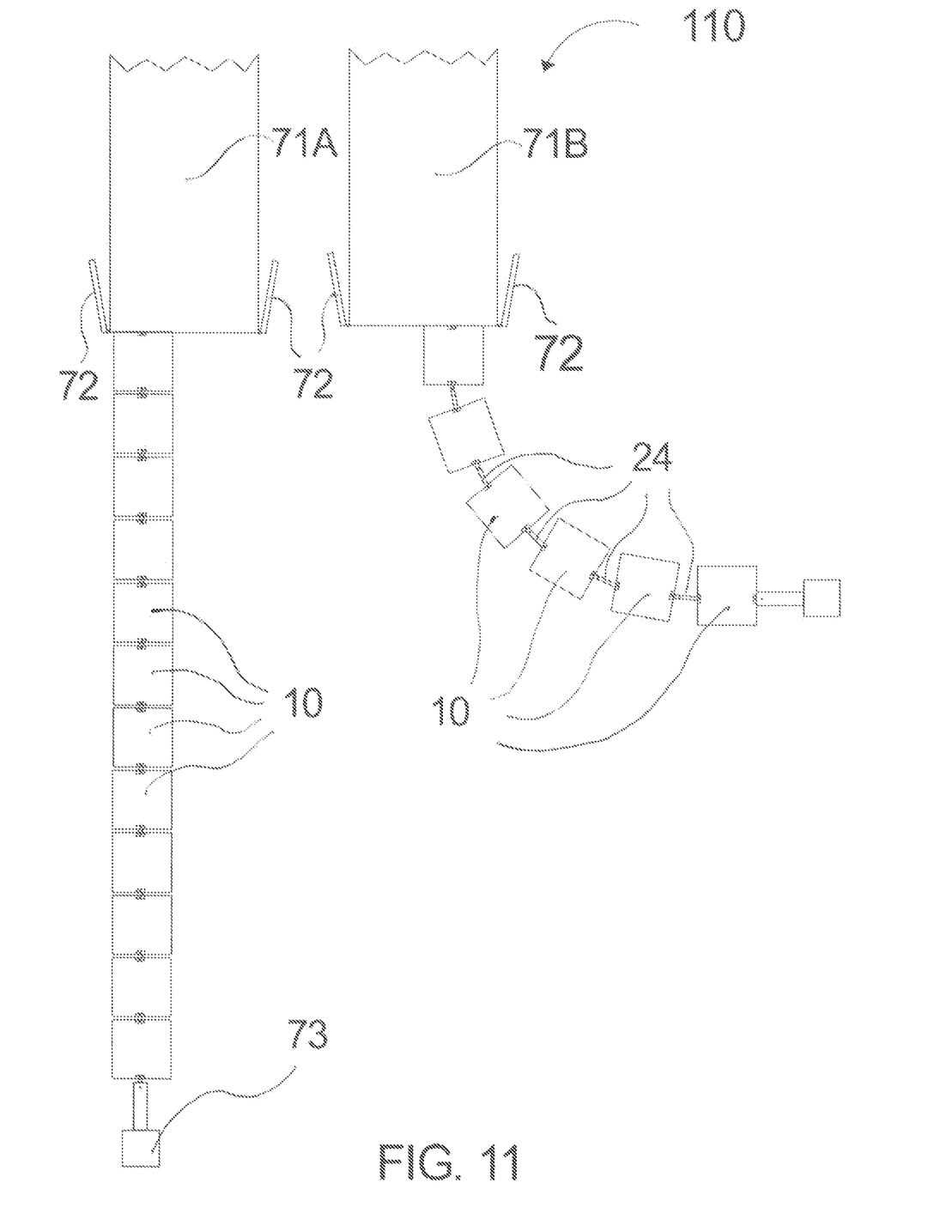
FIG. 11 depicts an aerial view of an environment in which the pallet system, which includes multiple platforms and tow bar middle plates, is used in conjunction with a forklift as well as two trailers that each include trailer doors, according to one embodiment.

FIG. 11 is an aerial view of an environment 110 that depicts the back of two trailers 71A, 71B with their trailer doors 72 open. For trailer 71A the platforms 10 are positioned on the left side of the trailer 71A and the platforms 10 are attached to each other with the tow bar (see FIGS. 5A-6D) positioned in the transport mode. This leaves about one to two inches of space between the platforms 10. This mode can be used if you have enough space behind the trailers to pull them all out at once. Trailer 71B reveals another row of interconnected platforms 10 but the tow bar middle plate 24 has been adjusted so there is about eight inches of space between the platforms, which enables the platforms 10 to be removed from the back of a trailer 71B and the train/row of interconnected platforms 10 can turn corners, both right and left. The platforms 10 can also be individually detached from each other and moved separately. All of this is done without a forklift going inside the trailer. At the front of both rows is a forklift 73 or a motorized mover that can pull all the platforms 10 out at once if that are heavy. If the platforms 10 are loaded up with things that are light, you can pull this whole train out by hand. If your freight is heavy and you do not have a motorized unite to pull them out of the trailer, you can always disconnect them one at a time and pull them out by hand.

Figure 12:
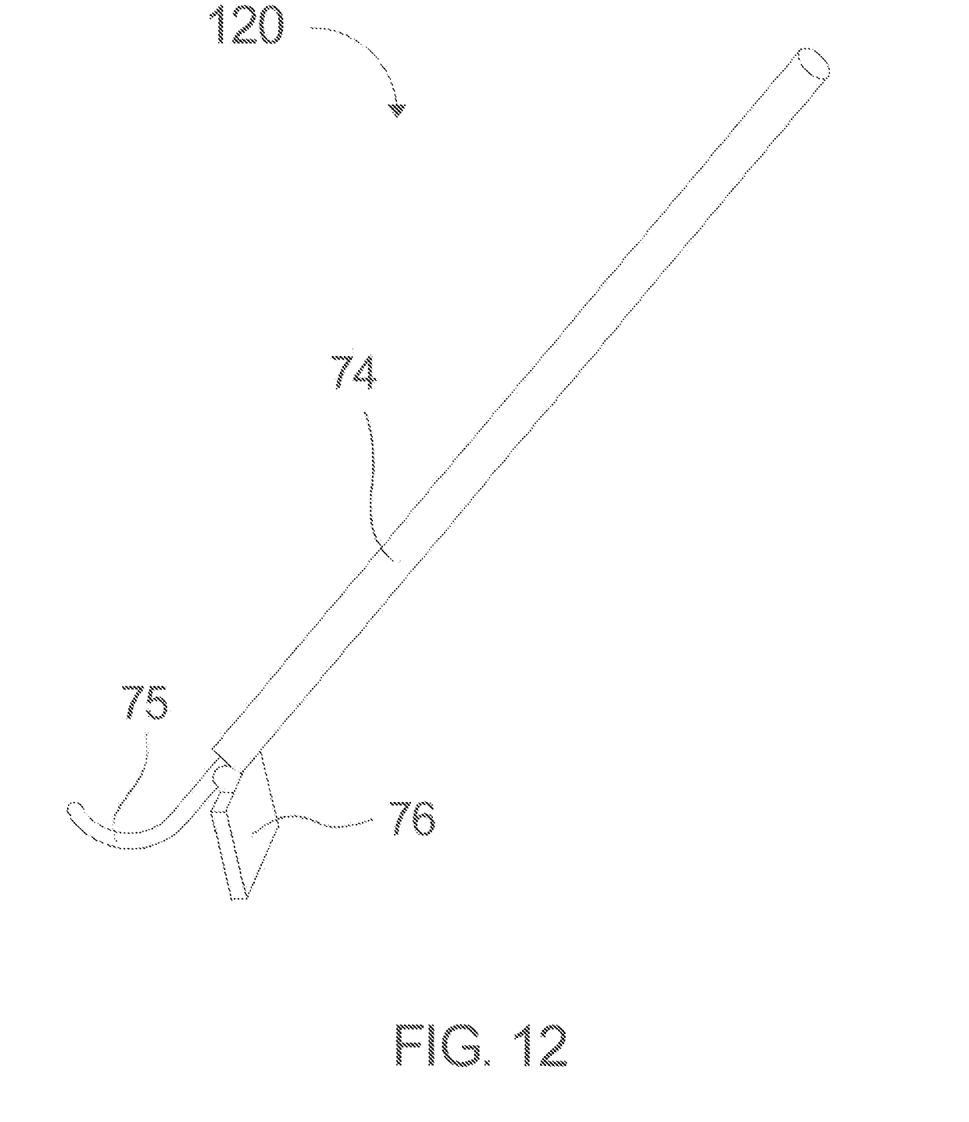
FIG. 12 is a perspective view of a pop pin puller, according to one embodiment.

FIG. 12 depicts a perspective view of a pop pin puller 120. The pop pin puller 120 is used to disengage the pop pins (see FIGS. 3C, 4C) in the front and the rear of the platforms (see FIGS. 1, 2, 7-8B). The pop pin puller 120 includes a pop pin puller rod 75 that is inserted in the bottom end of the pop pin handle 74 and the pop pin puller plate 76 is attached to the pop pin puller rod 75 which used as a lever when you need to disengage a pop pin (see FIGS. 3C, 4C). After you insert the pop pin puller rod 75 into the pop pin handle (see FIG. 1), and the pop pin puller handle 74 is pushed down, which causes the spring loaded pop pin (see FIGS. 3C, 4C) to disengage with the tow bar (see FIGS. 5A-6D).

The foregoing description of preferred embodiments of present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally and equitably entitled.

What is claimed is:

1. A transportable platform system for loading and unloading freight, the transportable platform system comprising:
   a transportable platform comprising:
      a top surface comprising plastic or wood, the top surface including:
         a plurality of perimeter stops attached to any portion of the top surface with screws;

a plurality of hooks positioned along a perimeter of the top surface, the plurality of hooks being configured to fasten to one or more nets;

at least two holes proximate a periphery of the platform configured to receive a bar code plate; and a bottom surface opposite the top surface, the bottom surface comprising:

at least two frame support members mounted to the bottom surface, a first frame support member forming a front edge and a second frame support member forming a rear edge;

three support members, each support member spatially separated one from another and extending in parallel along the bottom surface from the first frame support member to the second frame support member, a first support member of the three support members forming a first side edge, a second support member of the three support members forming a second side edge, and a third support member of the three support members traversing a median of the platform;

four caster blocks attached to the bottom surface of the platform, wherein a first caster block is positioned proximate a first joint formed between the first support member and the first frame support member, a second caster block positioned proximate a second joint formed between the second support member and the first frame support member, a third caster block positioned proximate a third joint formed between the first support member and the second frame support member, and a fourth caster block positioned proximate a fourth joint formed between the second support member and the second frame support member;

two pivoting casters operatively coupled to the first caster block and the second caster block; and two non-pivoting casters operatively coupled to the third caster block and the fourth caster block;

a carriage assembly operatively coupled to the bottom surface, the carriage assembly comprising:

a tow bar housing configured to house a first tow bar for a platform, the tow bar housing comprising:

a tow bar housing top plate comprising a housing top plate hole configured to engage the first tow bar via a first pop pin; and a tow bar housing bottom plate comprising a housing bottom plate hole configured to engage the first tow bar via the first pop pin;

a carriage link top plate comprising a top plate hole configured to engage a second tow bar via a second pop pin;

a carriage link bottom plate comprising a bottom plate hole configured to engage the second tow bar via the second pop pin, wherein at least two guides are connected to and disposed between the carriage link top plate and the carriage link bottom plate and positioned to straddle a channel formed between the carriage link top plate and the carriage link bottom plate; and a carriage link bar comprising a carriage link bar length extending from the tow bar housing to the carriage link top plate;

a tow bar comprising a tow bar length extending from a first end to a second end, the first end being configured to be slidably coupled to the tow bar housing via the first pop pin, the second end configured to be inserted between a carriage link top plate and a carriage link bottom plate of another transportable platform;

wherein tow bar comprises at least two hingedly connected sections extending along the tow bar length, a first section being connected to a second section via a hinge that comprises knuckles dovetailed together and comprising sloped ridges configured to limit rotation of the first section relative the second section;

wherein the tow bar housing of the carriage assembly is operatively coupled to the first frame support member and the third support member;

wherein the carriage link top plate is operatively coupled to the second frame support member and the third support member; and wherein the carriage link bar extends along the third support member.

2. The transportable platform system of claim 1, wherein the perimeter stops are attachable and detachable such that the perimeter stops can be repositioned via wood screws.

3. The transportable platform system of claim 1, wherein each hook of the plurality of hooks is attachable and detachable from the top surface using screws.

4. The transportable platform system of claim 1, wherein the transportable platform further comprises:

a plurality of platform corner tubes mounted within post holes, wherein the post holes include a hole height that extends across a height of the platform from the top surface to the bottom surface;

platform corner plates attached to the top surface and positioned such that plate holes of the platform corner plates are aligned with the post holes;

a plurality of tray vertical posts, each inserted through respective plate holes and respective post holes, each vertical post of the plurality of tray vertical posts extending across the hole height and coupled to respective platform corner tubes of the plurality of platform corner tubes proximate the bottom surface via respective safety pins that transversely traverse through pin holes positioned in sides of the plurality of tray vertical posts and the plurality of platform corner tubes, the plurality of tray vertical posts vertically extending from the top surface and configured to support an elevated tray suspended above the top surface;

two vertical post angle braces each including a first brace end and a second brace end, a first vertical post angle brace of the two vertical post angle braces being angled and coupled at a respective first brace end to a front side of a first rear tray vertical post of the plurality of tray vertical posts and coupled at a respective second brace end to the top surface, a second vertical post angle brace being angled and coupled at a respective first brace end to a front side of a second rear tray vertical post of the plurality of tray verticle posts and coupled at a respective second brace end to the top surface;

a tray frame that is slidably secured to each of the plurality of tray vertical posts at one of a plurality of pin hole heights of tray frame pin holes positioned along different heights of the plurality of tray vertical posts; and a tray platform coupled to the tray frame.

5. The transportable platform system of claim 4, wherein the tray frame, including the tray platform coupled thereto, is pivotably connected to the first rear tray vertical post and the second rear tray vertical post via tray frame plates that include a hinged connection such that the tray frame is configured to pivot and fold about the hinged connection towards the first rear tray vertical post and the second rear tray vertical post when disconnected from a first front tray vertical post and second front tray vertical post of the plurality of vertical posts.

6. A carriage assembly, comprising:
- a tow bar housing configured to house a first tow bar for a platform, the tow bar housing comprising:
  - a tow bar housing top plate comprising a housing top plate hole configured to engage the first tow bar via a first pop pin; and
  - a tow bar housing bottom plate comprising a housing bottom plate hole configured to engage the first tow bar via the first pop pin;
- a carriage link top plate comprising a top plate hole configured to engage a second tow bar via a second pop pin;
- a carriage link bottom plate comprising a bottom plate hole configured to engage the second tow bar via the second pop pin, wherein at least two guides are connected to and disposed between the carriage link top plate and the carriage link bottom plate and positioned to straddle a channel formed between the carriage link top plate and the carriage link bottom plate; and
- a carriage link bar comprising a length extending from the tow bar housing to the carriage link top plate.

7. A tow bar comprising a length extending from a first end to a second end, the first end being configured to be slidably coupled to a tow bar housing via a first pop pin that engages with one or more tow bar holes that traverse a height of the tow bar, the second end configured to be inserted between a carriage link top plate and a carriage link bottom plate of a second transportable platform and connected to the second transportable platform via a second pop pin that engages the carriage link top plate and the carriage link bottom plate, wherein at least two guides are connected to and disposed between the carriage link top plate and the carriage link bottom plate and positioned to straddle a channel formed between the carriage link top plate and the carriage link bottom plate such that tow bar traverses the channel during insertion;
- wherein tow bar comprises at least two hingedly connected sections extending along the length, a first section being connected to a second section via a hinge that comprises knuckles dovetailed together and comprising sloped ridges configured to limit rotation of the first section relative the second section.

* * * * *